United States Patent
De Graff et al.

[15] 3,650,664
[45] Mar. 21, 1972

[54] TEXTILE PRINTING METHOD

[72] Inventors: John E. De Graff, Waldwick; Theodore Antoniou, Oak Ridge; Peter Baganakis, North Haledon, all of N.J.

[73] Assignee: Inmont Corporation, New York, N.Y.

[22] Filed: Apr. 4, 1968

[21] Appl. No.: 718,946

[52] U.S. Cl. .................................................8/18, 8/71, 8/62, 8/115.6, 8/54.2, 260/29.6 H
[51] Int. Cl. .............................D06p 5/04, C09b 27/00, Do6, C08f 45/26
[58] Field of Search...................8/79, 71, 115.6, 116.3, 54.2, 8/18; 260/29.6, 29.6 B, 29.6 WA, 29.6 BE

[56] References Cited

UNITED STATES PATENTS

| | | | |
|---|---|---|---|
| 3,223,663 | 12/1965 | Altobelli | 260/28.5 |
| 3,255,127 | 6/1966 | Bonin | 260/2.5 |
| 3,440,199 | 4/1969 | Lindemann | 260/29.6 |
| 3,186,974 | 6/1965 | Verberg | 260/85.7 |
| 3,355,322 | 11/1967 | Worrall et al. | 117/126 |
| 3,132,965 | 4/1964 | Schmidt | 117/38 |

Primary Examiner—George F. Lesmes
Assistant Examiner—B. Bettis
Attorney—F. W. Wyman

[57] ABSTRACT

Textile print pastes containing an aqueous phase emulsified into a continuous phase containing pigment dispersed in a solution of resins, including a vinyl acetate-ethylene copolymer containing 20.0 to 50.0 percent vinyl acetate.

1 Claims, No Drawings

TEXTILE PRINTING METHOD

This invention relates to textile printing; more specifically the invention relates to pigmented water-in-oil emulsion type textile printing pastes and aims to provide such print pastes having improved wet and dry crock, handle and soundness of print.

The art of printing on textiles with pigmented water-in-oil (lacquer) emulsions began in the early 1940's and has expanded rapidly. The original printing compositions were made by emulsifying water into pigmented solutions of thermosetting resins using alkyd resins as emulsifying agent and plasticizer for the thermosetting resins (Jenett U.S. Pat. Nos. 2,222,581 and 2,222,582). Prints made with such emulsions had good fastness to washing and dry cleaning and were less stiff than fabrics printed with pigmented lacquers. A major improvement in printing with pigmented emulsion was the addition of dispersed elastomers to the emulsions to reduce crocking (Booth U.S. Pat. No. 2,691,005). Other low-crock additives that have been introduced include: polyethylene gel dispersions (Lee, U.S. Pat. No. 2,558,053); butadiene-styrene copolymers dispersions (Lee, U.S. Pat. No. 2,504,136).

Although the art has provided great improvement in the crockfastness of prints made with pigmented water-in-lacquer emulsions there has been a desire for even better crockfastness. Additionally, the trade has long sought for improvement in "handle," i.e., less stiffening, of fabrics printed with pigmented water-in-lacquer emulsions. The novel print pastes of the present invention provide improvements in both wet and dry crock, and handle. Additionally, the print pastes provide improvement in soundness of print.

The essential ingredients of a pigmented water-in-oil type print paste include a continuous organic phase consisting of a volatile water-immiscible organic solvent, an alkyd resin or ethyl cellulose, such as would conventionally be used as an emulsifying agent, and a dispersed water-insoluble pigment color. The dispersed aqueous phase consists of a water insoluble elastomeric resin which is substantially insoluble in the organic solvent. In accordance with the present invention we have discovered that the addition of organic soluble vinyl resins particularly copolymers of ethylene-vinyl acetate and carboxylated ethylene-vinyl acetate to the continuous phase of the water-in-oil print paste greatly improve the wet and dry crockfastness of the final textile print. Although these resins act primarily as anti-crocking agents, they also improve the handle and soundness of the print.

The ethylene-vinyl acetate copolymers that are operable in this invention consist of 20–50 parts of vinyl acetate, 50–80 parts ethylene, and 0–5 parts of an organic acid. When there is no carboxylic acid in the copolymer the preferred ethylene-vinyl acetate copolymer is composed of 45 parts vinyl acetate and 55 parts ethylene. The preferred carboxylated terpolymer consists of 29 parts vinyl acetate, 5 parts organic acid, and the remainder ethylene. The acid component of the carboxylated terpolymer is an $\alpha,\beta$-ethylenically unsaturated organic acid such as acrylic or methacrylic acid.

The amount of vinyl resin anti-crocking agent is preferably within the ratio of 0.4 to 1.4 parts for each part of pigment.

The ethylene-vinyl acetate copolymer and the carboxylated ethylene-vinyl acetate may be employed separately or in combination with each other to provide improvement in both wet and dry crock. When used in combination with one another, an improvement in dry cleaning resistance is also noted.

For optimum dry crock properties the print paste should contain such dry crock additives as described in U.S. Pat. No. 3,223,663, e.g., water insoluble polysiloxane materials, paraffin waxes especially microcrystalline wax and lubricating oils.

Other conventional additives may be included in the print pastes if desired. For example, humectants, water-soluble resins, diluents, plasticizers, emulsion stabilizers, water thickeners, etc.

The color can be any organic or inorganic pigment that is commonly used for textile printing, e.g., phthalocyanine blue, phthalocyanine green, azo reds, benzidine yellow, carbon black, and iron oxide.

Pigmented printing pastes of lower color concentration can be prepared by diluting the pastes with conventional clear or unpigmented printing vehicles.

The following examples in which the parts are by weight will further illustrate the invention.

EXAMPLE 1

A green color concentrate is prepared by flushing 26.0 parts of phthalocyanine green with 20.0 parts of 25 percent solution of a copolymer of 55 percent ethylene - 45 percent vinyl acetate in Solvesso 100 and enough water to make 100 percent. The flushed composition contains 48.5 percent pigment. The parts by weight to give a 20.35 percent pigment concentrate are:

| | |
|---|---|
| Flushed phthalocyanine green pigment | 42.0=20.35 dry |
| 25% solution of a copolymer of 55% ethylene–45% vinyl acetate in Solvesso 100 | 27.52 |
| Resimene 882 (butylated melamine formaldehyde resin 66% solids in xylene) | 6.3 |
| Ethyl cellulose solution (13.65 parts octyl alcohol, 71.35 parts Solvesso 100, 1.5 parts 50 cp. grade N-type, 3.0 parts 50 cp. grade K-type and 10.5 parts 50 cp. grade G-type ethyl cellulose) | 1.8 |
| Pine oil | 2.7 |
| Octyl alcohol | 2.7 |
| Paraplex G–60 | 4.5 |
| Micro-crystalline wax, 40% dispersion in Solvesso 100 | 2.3 |
| Xylene to make 100% | |

A water-in-oil emulsion type clear extender paste for use with the above concentrate would consist of 2.5 parts of a concentrate containing 14.2 percent Beckosol P–376 (50 percent solids phenolated tall oil alkyd resin), 19.7 percent Beckosol P–723 (50 percent solids medium length tall oil phenolic alkyd resin), 14.2 percent Beckosol P–669 (50 percent solids phenolic free resin modified fish oil alkyd resin), 20 percent hexamethoxy methylmelamine, 0.8 percent 2-amino-2-methyl-1-propanol and 31.1 percent diammonium sulfate, diluted with 30 parts Varsol No. 2 and enough water to make 100 parts.

A print paste is prepared by mixing the extender paste, color concentrate and a dispersion of a water insoluble cross-linking elastomer or fixative in the ratio required to print the desired depth of shade. The cross-linking elastomeric dispersion would consist of:

| | |
|---|---|
| Beckosol P–723 Alkyd resin solution (50% solids xylene) | 4.85 |
| | 0.95 |
| Microcrystalline wax, 40% dispersion in Varsol No. 2 | 25.73 |
| DC–36 silicone emulsion | 4.85 |
| Latex of a 5:2 ratio butadiene:acrylonitrile latex (Goodrich Latex 1570X38) | 25.45 |
| Water to make 100% | |

The alkyd resin used in the fixative is made from 10.8 parts of a polymeric polyhydric alcohol having alternating aliphatic chains and aromatic nuclei united through ether oxygen and containing approximately 7 hydroxyl groups per mole and having a molecular weight on the order of 900 (e.g., Epon 1001), 10.8 parts of a phenoxyethanol-formaldehyde condensate of melting point 76° C., 14.3 parts soya fatty acids and 2.86 parts of phthalic anhydride.

A preferred print paste for printing at 4 percent pigment concentration would consist of:

| | |
|---|---|
| Concentrate color | 24.6 |
| Water-in-oil emulsion extender paste | 60.4 |
| Fixative | 15.0 |

This print paste gives a deep green color when printed on cotton fabrics. Curing at 325° F. for about 3 minutes gives a print having excellent fastness properties. The print also exhibits improved wet and dry crock, handle and soundness of print when compared to textile prints produced from conventional water-in-oil emulsion print pastes.

EXAMPLE 2

A red color concentrate is prepared by flushing 12 parts mono-azo-naphthol AS red pigment (prepared by coupling diazotized 3-amino-4-methoxy-benzamide to 4'-chloro-3-hydroxy-2-naphtho-o-toluidide) with 18.4 parts of a 25 percent solution of a copolymer of 55 percent ethylene - 45 percent vinyl acetate in Solvesso 100, 4.0 parts of Resimene 873 (butylated melamine formaldehyde resin 50 percent solids in 1:1 butanol:xylene), 4.0 parts xylene and enough water to make 100 percent. The flushed composition contains 25.65 percent pigment. The parts by weight to give a 12 percent pigment concentrate are:

| | |
|---|---|
| Flushed red pigment | 46.8=12.0 dry pigment |
| 25% solution of a copolymer of 55% ethylene–45% vinyl acetate in Solvesso 100 | 25.8 |
| Ethyl cellulose solution (same as in color concentrate of Ex. 1) | 2.0 |
| Ethyl cellulose solution (9.5 parts 50 cp. grade T-Type ethyl cellulose, 15.0 parts octyl alcohol, 75.5 parts turpentine) | 2.0 |
| Octyl alcohol | 4.0 |
| Resimene 882 | 3.0 |
| Micro-crystalline wax, 40% dispersion in Solvesso 100 | 5.0 |
| Plastolein 9058 | 5.0 |
| Xylene | 6.4 |
| | 100.0 |

This print paste gives a strong red color when printed on cotton fabrics. The prints after curing at 325° F. for about 3 minutes have good wet and dry crock resistance, handle and soundness of print.

EXAMPLE 3

A green color concentrate is prepared by flushing 11.16 parts of phthalocyanine green with 2.0 parts of a 40 percent aqueous solution of Tamol N, 4.07 parts Resimene 884 (butylated melamine-formaldehyde resin 60 percent in 1:1 butanol:turpentine), 14.35 parts 17 percent solution of a terpolymer of 29 percent vinyl acetate, 5 percent acrylic acid and the remainder ethylene in xylene, 3.0 parts Plastolein 9058, 4.0 parts xylene, 2.0 parts of a 25 percent calcium chloride solution in water and enough water to make 100 percent. The flushed composition contains 43.75 percent pigment. The parts by weight to give a 20.35 percent pigment concentrate are:

| | |
|---|---|
| Flushed phthalocyanine green pigment | 46.5=20.35 dry pigment |
| Resimene 884 | 3.6 |
| 17% solution of a terpolymer (29% vinyl acetate, 5% acrylic acid and remainder ethylene) in xylene | 36.6 |
| Plastolein 9058 | 2.0 |
| Ethyl cellulose solution (same as color concentrate in Ex. 1) | 2.0 |
| Ethyl cellulose solution (Y-Type same as color concentrate in Ex. 2) | 2.0 |
| Xylene | 7.3 |
| | 100.0 |

A print paste using the above color concentrate gives a deep green color when printed on cotton fabrics and exhibits the same excellent properties as Example 1.

EXAMPLE 4

A red color concentrate is prepared by flushing 12.0 parts mono-azo-naphthol AS red pigment of Example 2 with 1.25 parts of a 40 percent aqueous solution of Tamol N, 23.5 parts of a 17 percent solution of a terpolymer described in Example 3 in xylene, 2.0 parts of a 25 percent calcium chloride solution in water, 0.5 parts of an ethyl cellulose solution (T-Type as described in Example 2) and enough water to make 100 percent. The flushed material contains 29.1 percent pigment. The parts by weight to give a 13.5 percent pigment concentrate are:

| | |
|---|---|
| Flushed red pigment | 46.4=13.5 dry pigment |
| Resimene 884 | 3.4 |
| Octyl alcohol | 3.4 |
| Plastolein 9058 | 5.6 |
| Ethyl cellulose solution (same as color concentrate in Example 1) | 2.3 |
| Ethyl cellulose solution (T-Type as described in Example 2) | 1.7 |
| Micro-crystalline wax, 40% dispersion in Solvesso 100 | 6.7 |
| Xylene | 30.5 |
| | 100.0 |

A print paste employing the above color concentrate affords a strong red color when printed on cotton fabrics and exhibits the same excellent properties as Example 2.

EXAMPLE 5

A yellow color concentrate is prepared by flushing 11.16 parts benzidine yellow (tetrazotized 3,3'-dichlorobenzidine coupled to acetoacet-2,4-dimethylaniline), 0.75 parts 40 percent Tamol N solution in water, 3.72 parts Resimene 873; 13.12 parts of a 17 percent solution of a terpolymer described in Example 3 in xylene, 1.15 parts of 25 percent calcium chloride solution in water, 1.0 parts xylene, and enough water to make 100 percent. The flushed material contains 33.55 percent pigment; the parts by weight to give a 11.16 percent pigment concentrate are:

| | |
|---|---|
| Flushed benzidine yellow pigment | 33.3=11.16 dry pigment |
| Ethyl cellulose solution (T-Type same as in color concentrate in Ex. 2) | 2.0 |
| Resimene 884 | 3.72 |
| 17% solution of terpolymer described in Ex. 3 in xylene | 45.9 |
| Plastolein 9058 | 5.0 |
| Xylene | 10.8 |
| | 100.0 |

A print paste employing the above color concentrate produces a pleasing yellow print when printed on cotton. The print displays improved wet and dry crock, handle and soundness of print.

EXAMPLE 6

A black color concentrate containing 17.1% pigment is prepared from the following:

| | |
|---|---|
| Dry carbon black pigment (furnace type) | 17.1 |
| 17% solution of a terpolymer described in Ex. 3 in xylene | 48.2 |
| Octyl alcohol | 2.2 |
| Resimene 882 | 6.7 |

| | |
|---|---|
| Paraplex G–60 | 16.7 |
| Solvesso 150 | 9.1 |
| | 100.0 |

A textile print utilizing the above color concentrate displayed good wet and dry crock resistance, handle and soundness of print.

Paraplex G–60 is a polymeric plasticizer consisting of epoxidized soya oils.

Pastolein 9058 is a plasticizer derived from di-2-ethylhexyl azelate.

Resimene 873—butylated melamine formaldehyde resin 50 percent solids in 1:1 butanol:xylene.

Resimene 882—butylated melamine formaldehyde resin 66 percent solids in xylene.

Resimene 884—butylated melamine formaldehyde resin 60 percent in 1:1 butanol:turpentine.

Solvesso 100 is a petroleum hydrocarbon solvent having a boiling range 320°–360° F. and a kauri-butanol value of about 89.

Solvesso 150 is a petroleum hydrocarbon solvent having a boiling range 365°–425° F. and a kauri-butanol value of about 88.

Tamol N is the condensation product of β-naphthalene sulfonic acid and formaldehyde.

Varsol No. 2 is a petroleum hydrocarbon solvent having a boiling range 315°–394° F. and a kauri-butanol value of about 45.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

I claim:

1. In a method of printing textiles comprising the steps of:
   a. applying a water-in-oil emulsion type printing composition, comprising an aqueous phase and a pigment containing water immiscible phase, to the textile,
   b. curing the printed textile,
   the improvement comprising
   c. dissolving in the water immiscible phase, prior to the addition of the aqueous phase, from 0.4 to 1.4 parts, per part of pigment, of a copolymer of from 20.0 to 50.0 parts vinyl acetate with 50.0 to 80.0 parts of ethylene and 0.0 to 5.0 parts of an acrylic acid to achieve improved crockfastness in the printed textile.

* * * * *